United States Patent
Watanabe

(10) Patent No.: US 11,784,669 B2
(45) Date of Patent: Oct. 10, 2023

(54) RADIO-FREQUENCY MODULE AND A COMMUNICATION DEVICE THAT CAN SUPPRESS DEGRADATION OF CHARACTERISTICS OF ELECTRICAL CIRCUITS FORMED AT AN INTEGRATED CIRCUIT

(71) Applicant: Murata Manufacturing Co., Ltd., Kyoto (JP)

(72) Inventor: Takashi Watanabe, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 3 days.

(21) Appl. No.: 17/457,699

(22) Filed: Dec. 6, 2021

(65) Prior Publication Data
US 2022/0200641 A1 Jun. 23, 2022

(30) Foreign Application Priority Data
Dec. 23, 2020 (JP) .................. 2020-213337

(51) Int. Cl.
*H04B 1/00* (2006.01)
*H04B 1/04* (2006.01)
*H04B 1/16* (2006.01)

(52) U.S. Cl.
CPC ......... *H04B 1/0078* (2013.01); *H04B 1/0458* (2013.01); *H04B 1/1607* (2013.01); *H04B 2001/0408* (2013.01)

(58) Field of Classification Search
CPC ............ H03F 2200/451; H03F 1/565; H03F 2200/294; H03F 3/195; H03F 3/245; H03F 2200/222; H03F 2200/111; H03F 3/193; H03F 2200/387; H03F 3/72; H03F 1/3205; H03F 3/19; H03F 3/24; H03F 1/32; H03F 2200/534; H03F 1/347; H03F 2203/7209; H03F 2200/541; H03F 1/22; H03F 1/56; H03F 2200/171; H03F 2200/411; H03F 2200/537; H03F 2200/75; H03F 3/211; H03F 3/213; H03F 3/68; H03F 1/0205; H04B 1/0458; H04B 1/18; H04B 1/40; H04B 1/0475; H04B 1/44; H04B 1/006; H04B 1/48; H04B 2001/0408; H04B 2001/0433; H04B 1/0057; H04B 1/04; H04B 1/0483; H04B 2001/485;

(Continued)

(56) References Cited

U.S. PATENT DOCUMENTS

| | | | |
|---|---|---|---|
| 2010/0285770 A1* | 11/2010 | Takikawa | H04W 52/52 455/333 |
| 2012/0200965 A1 | 8/2012 | Furutani | |
| 2020/0035592 A1* | 1/2020 | Honda | H01L 23/49833 |

FOREIGN PATENT DOCUMENTS

WO   2011/052480 A1   5/2011

* cited by examiner

*Primary Examiner* — Golam Sorowar
(74) *Attorney, Agent, or Firm* — Pearne & Gordon LLP

(57) ABSTRACT

A radio-frequency module includes a module substrate having a major surface on which a ground electrode pattern is formed and an integrated circuit disposed on the major surface of the module substrate. The integrated circuit includes a control/power supply circuit having at least one of a control circuit and a power supply circuit and a second electrical circuit having at least one of an amplifier, a switch, and a filter. In plan view, the ground electrode pattern overlaps at least a part of the control/power supply circuit and does not overlap at least a part of the second electrical circuit.

19 Claims, 5 Drawing Sheets

(58) Field of Classification Search
CPC .. H04B 1/0064; H04B 1/0078; H04B 1/1027; H04B 1/1036; H04B 1/16; H04B 1/3827; H04B 1/1018; H04B 1/109; H04B 1/12; H04B 1/401; H04B 2001/0416; H01L 23/66; H01L 2924/00014; H01L 2223/6677; H01L 2224/16225; H01L 2224/48091; H01L 2224/48227; H01L 2224/49171; H01L 23/552; H01L 2924/00; H01L 2223/665; H01L 2223/6655; H01L 2224/16145; H01L 2224/32145; H01L 2224/48195; H01L 2224/73265; H01L 2924/19104; H01L 2224/11; H01L 2224/97; H01L 2924/19105; H01L 2224/16227; H01L 2224/45099; H01L 23/5227; H01L 24/13
See application file for complete search history.

RADIO-FREQUENCY MODULE AND A COMMUNICATION DEVICE THAT CAN SUPPRESS DEGRADATION OF CHARACTERISTICS OF ELECTRICAL CIRCUITS FORMED AT AN INTEGRATED CIRCUIT

CROSS REFERENCE TO RELATED APPLICATION

This application claims priority from Japanese Patent Application No. 2020-213337 filed on Dec. 23, 2020. The content of this application is incorporated herein by reference in its entirety.

BACKGROUND

The present disclosure relates to a radio-frequency module and a communication device.

In mobile communication devices such as mobile phones, radio-frequency front-end modules have become complex together with the development of multiband operation. In International Publication No. 2011/052480, an integrated circuit is mounted on a ground pad formed on a surface of a package substrate.

BRIEF SUMMARY

The technology described above may, however, degrade characteristics of electrical circuits formed at the integrated circuit.

The present disclosure provides a radio-frequency module and a communication device that can suppress degradation of characteristics of electrical circuits formed at an integrated circuit.

A radio-frequency module according to an aspect of the present disclosure includes a module substrate having a major surface on which a ground electrode pattern is formed and an integrated circuit disposed on the major surface of the module substrate. The integrated circuit includes a first electrical circuit having at least one of a control circuit and a power supply circuit and a second electrical circuit having at least one of an amplifier, a switch, and a filter. In plan view, the ground electrode pattern overlaps at least a part of the first electrical circuit, and the ground electrode pattern does not overlap at least a part of the second electrical circuit.

The radio-frequency module according to an aspect of the present disclosure can suppress degradation of characteristics of electrical circuits formed at an integrated circuit.

Other features, elements, characteristics and advantages of the present disclosure will become more apparent from the following detailed description of embodiments of the present disclosure with reference to the attached drawings.

DETAILED DESCRIPTION

Figure 1:
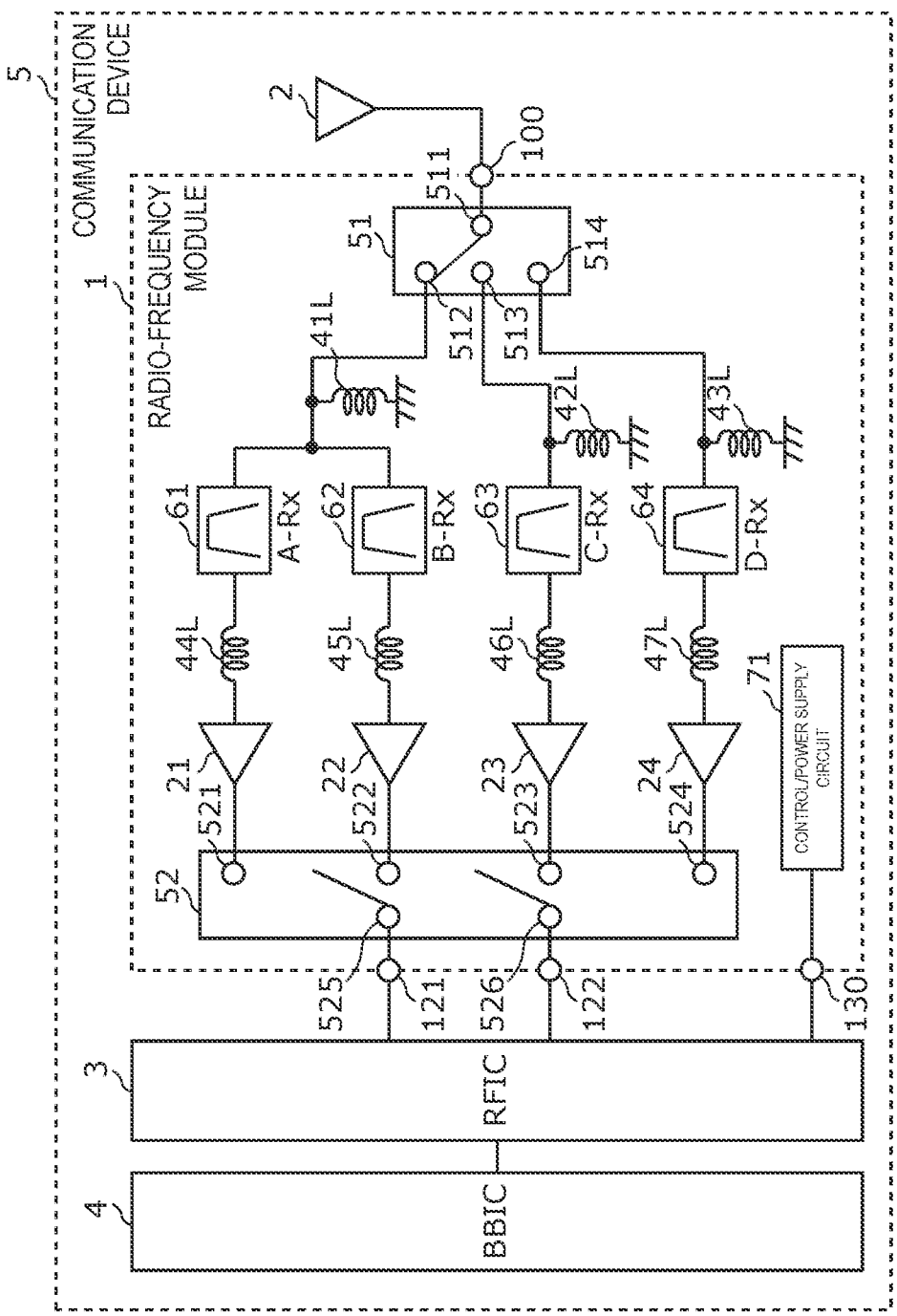
FIG. 1 is a circuit configuration diagram of a radio-frequency module and a communication device according to an embodiment.

Hereinafter, an embodiment of the present disclosure will be described in detail with reference to the drawings. It should be noted that the embodiment described below is a specific or comprehensive example. Specifics including numerical values, shapes, materials, constituent elements, arrangements of the constituent elements, and modes of connection given in the following embodiment are mere instances and are not intended to limit the present disclosure.

The drawings are schematically illustrated with appropriate accentuation, omission, or proportion adjustment to depict the present disclosure and are not necessarily illustrated in an exact manner; therefore, the shape, positional relationship, and proportion may be different from actual ones. Like reference symbols are used to denote substantially like configurations in the drawings, and redundant descriptions thereof may be omitted or simplified.

In the drawings described later, the X axis and the Y axis are axes perpendicular to each other in a plane parallel to major surfaces of a module substrate. Specifically, when the module substrate is rectangular in plan view, the X axis is parallel to a first side of the module substrate; the Y axis is parallel to a second side of the module substrate perpendicular to the first side; the Z axis is perpendicular to major surfaces of the module substrate, the forward direction of the Z axis indicates the upward direction, and the reverse direction of the Z axis indicates the downward direction.

Regarding the circuit configuration of the present disclosure, the expression "coupled" includes not only the case in which a circuit element is directly coupled to another circuit element by using a connection terminal and/or a wiring conductor but also the case in which a circuit element is electrically coupled to another circuit element via still another circuit element. The expression "directly coupled" denotes that a circuit element is directly coupled to another circuit element by using a connection terminal and/or a wiring conductor without necessarily intermediate connection with still another circuit element. The expression "is coupled between A and B" denotes that the subject is positioned between A and B and coupled to both A and B, and the expression includes the case in which the subject is coupled in a series manner in a path connecting A and B and the case in which the subject is coupled between the path and the ground.

Regarding the component arrangement of the present disclosure, the expression "plan view" denotes that an object orthogonally projected on an xy plane is viewed from the positive side of the Z axis. The expression "A overlaps B when viewed in plan view" denotes that the area of A orthogonally projected on the xy plane overlaps the area of B orthogonally projected on the xy plane. The expression "A is positioned between B and C" denotes that at least one of line segments each connecting a point of B and a point of C passes A. Additionally, words used to express relationships between elements, such as "parallel" and "vertical", words used to express the shape of an element, such as "rectangular", and numerical ranges do not necessarily denote the exact meanings but denote substantially the same meanings involving, for example, several percent differences.

The expression "a component is disposed at a substrate" includes the case in which the component is positioned in contact with the substrate, the case in which the component is positioned over the substrate without necessarily contact with the substrate (for example, the component is stacked on a component disposed on the substrate), and the case in which the component is partially or entirely embedded in the substrate. The expression "a component is disposed at a major surface of a substrate" includes the case in which the component is positioned in contact with the major surface of the substrate, the case in which the component is positioned over the major surface without necessarily contact with the major surface, and the case in which the component is partially embedded in the substrate at the major surface.

Embodiment 1.1 Circuit Configuration of Radio-Frequency Module 1 and Communication Device 5

A circuit configuration of a radio-frequency module 1 and a communication device 5 according to the present embodiment will be described with reference to FIG. 1. FIG. 1 is a circuit configuration diagram of the radio-frequency module 1 and the communication device 5 according to the present embodiment.

1.1.1 Circuit Configuration of Communication Device 5

Firstly, a circuit configuration of the communication device 5 will be described. As illustrated in FIG. 1, the communication device 5 according to the present embodiment includes the radio-frequency module 1, an antenna 2, a radio frequency integrated circuit (RFIC) 3, and a baseband integrated circuit (BBIC) 4.

The radio-frequency module 1 transfers a radio-frequency signal between the antenna 2 and the RFIC 3. An internal structure of the radio-frequency module 1 will be described later.

The antenna 2 is coupled to an antenna connection terminal 100 of the radio-frequency module 1. The antenna 2 receives a radio-frequency signal from outside and outputs the radio-frequency signal to the radio-frequency module 1.

The RFIC 3 is an example of a signal processing circuit for processing a radio-frequency signal. Specifically, the RFIC 3 processes a radio-frequency receive signal inputted through a receive path of the radio-frequency module 1 by performing, for example, downconversion and outputs the processed receive signal generated by the signal processing to the BBIC 4. The RFIC 3 includes a controller for controlling, for example, a switch and an amplifier of the radio-frequency module 1. The function of the controller of the RFIC 3 may be partially or entirely implemented outside the RFIC 3; for example, the function of the controller may be partially or entirely implemented in the BBIC 4 or the radio-frequency module 1.

The BBIC 4 is a baseband signal processing circuit configured to perform signal processing by using an intermediate frequency band lower than radio-frequency signals transferred by the radio-frequency module 1. As the signal processed by the BBIC 4, for example, an image signal for displaying an image and/or a sound signal for calls through a speaker are used.

In the communication device 5 according to the present embodiment, the antenna 2 and the BBIC 4 are optional constituent elements.

1.1.2 Circuit Configuration of Radio-Frequency Module 1

Next, a circuit configuration of the radio-frequency module 1 will be described. As illustrated in FIG. 1, the radio-frequency module 1 includes low-noise amplifiers 21 to 24, inductors 41L to 47L, switches 51 and 52, filters 61 to 64, a control/power supply circuit 71, the antenna connection terminal 100, radio-frequency output terminals 121 and 122, and a control/power supply terminal 130.

The antenna connection terminal 100 is coupled to the antenna 2 outside the radio-frequency module 1.

The radio-frequency output terminals 121 and 122 are both configured to provide a radio-frequency receive signal outside the radio-frequency module 1. In the present embodiment, the radio-frequency output terminals 121 and 122 are coupled to the RFIC 3 outside the radio-frequency module 1.

The control/power supply terminal 130 is a terminal for transferring control signals and supply power. The control/power supply terminal 130 is a terminal for receiving control signals and supply power from outside of the radio-frequency module 1 and/or supplying control signals to outside of the radio-frequency module 1. The control signal is a signal related to control of the electronic components included in the radio-frequency module 1. Specifically, the control signal is a digital signal for controlling, for example, the low-noise amplifiers 21 to 24 and the switches 51 and 52. The supply power is electric power supplied from a power supply (not illustrated in the drawing).

The low-noise amplifier 21, which is an example of a first low-noise amplifier, can amplify a receive signal in a band A received through the antenna connection terminal 100. The low-noise amplifier 21 is coupled between the filter 61 and the radio-frequency output terminals 121 and 122. Specifically, an input end of the low-noise amplifier 21 is coupled to the filter 61 via the inductor 44L. An output end of the low-noise amplifier 21 is coupled to the radio-frequency output terminal 121 or 122 via the switch 52.

The low-noise amplifier 22, which is an example of a second low-noise amplifier, can amplify a receive signal in a band B received through the antenna connection terminal 100. The low-noise amplifier 22 is coupled between the filter 62 and the radio-frequency output terminals 121 and 122. Specifically, an input end of the low-noise amplifier 22 is coupled to the filter 62 via the inductor 45L. An output end of the low-noise amplifier 22 is coupled to the radio-frequency output terminal 121 or 122 via the switch 52.

The low-noise amplifier 23, which is an example of a third low-noise amplifier, can amplify a receive signal in a band C received through the antenna connection terminal 100. The low-noise amplifier 23 is coupled between the filter 63 and the radio-frequency output terminals 121 and 122. Specifically, an input end of the low-noise amplifier 23 is coupled to the filter 63 via the inductor 46L. An output end of the low-noise amplifier 23 is coupled to the radio-frequency output terminal 121 or 122 via the switch 52.

The low-noise amplifier 24, which is an example of a fourth low-noise amplifier, can amplify a receive signal in a band D received through the antenna connection terminal 100. The low-noise amplifier 24 is coupled between the filter 64 and the radio-frequency output terminals 121 and 122. Specifically, an input end of the low-noise amplifier 24 is coupled to the filter 64 via the inductor 47L. An output end of the low-noise amplifier 24 is coupled to the radio-frequency output terminal 121 or 122 via the switch 52.

The inductor 41L is coupled between the switch 51 and the filters 61 and 62. Specifically, the inductor 41L is coupled between a path connecting a terminal 512 of the switch 51 and an input end of the filter 61, and the ground, and the inductor 41L is also coupled between a path connecting the terminal 512 of the switch 51 and an input end of the filter 62, and the ground. The inductor 41L forms an impedance matching circuit and can provide impedance matching between the output impedance of the switch 51 and the input impedance of the filters 61 and 62.

The inductor 42L is coupled between the switch 51 and the filter 63. Specifically, the inductor 42L is coupled between a path connecting a terminal 513 of the switch 51 and an input end of the filter 63, and the ground. The inductor 42L forms an impedance matching circuit and can provide impedance matching between the output impedance of the switch 51 and the input impedance of the filter 63.

The inductor 43L is coupled between the switch 51 and the filter 64. Specifically, the inductor 43L is coupled between a path connecting a terminal 514 of the switch 51 and an input end of the filter 64, and the ground. The inductor 43L forms an impedance matching circuit and can provide impedance matching between the output impedance of the switch 51 and the input impedance of the filter 64.

The inductor 44L, which is an example of a first inductor, is coupled between the filter 61 and the low-noise amplifier 21. Specifically, the inductor 44L is coupled in a series manner in a path connecting an output end of the filter 61 and the input end of the low-noise amplifier 21. The inductor 44L forms an impedance matching circuit and can provide impedance matching between the output impedance of the filter 61 and the input impedance of the low-noise amplifier 21.

The inductor 45L, which is an example of a second inductor, is coupled between the filter 62 and the low-noise amplifier 22. Specifically, the inductor 45L is coupled in a series manner in a path connecting an output end of the filter 62 and the input end of the low-noise amplifier 22. The inductor 45L forms an impedance matching circuit and can provide impedance matching between the output impedance of the filter 62 and the input impedance of the low-noise amplifier 22.

The inductor 46L, which is an example of a third inductor, is coupled between the filter 63 and the low-noise amplifier 23. Specifically, the inductor 46L is coupled in a series manner in a path connecting an output end of the filter 63 and the input end of the low-noise amplifier 23. The inductor 46L forms an impedance matching circuit and can provide impedance matching between the output impedance of the filter 63 and the input impedance of the low-noise amplifier 23.

The inductor 47L, which is an example of a fourth inductor, is coupled between the filter 64 and the low-noise amplifier 24. Specifically, the inductor 47L is coupled in a series manner in a path connecting an output end of the filter 64 and the input end of the low-noise amplifier 24. The inductor 47L forms an impedance matching circuit and can provide impedance matching between the output impedance of the filter 64 and the input impedance of the low-noise amplifier 24.

In the present embodiment, the inductors 41L to 43L are shunt inductors, and the inductors 44L are 47L are series inductors. The inductors are, however, not limited to this example. For example, the inductors 41L to 43L may be series inductors, and the inductors 44L to 47L may be shunt inductors. Alternatively, capacitors may be used instead of the inductors 41L to 47L, or both inductors and capacitors may be used.

The switch 51, which is an example of a first switch, is coupled between the antenna connection terminal 100 and the filters 61 to 64. The switch 51 is formed by, for example, a multi-connection switching circuit. The switch 51 may be referred to as an antenna switch. Specifically, the switch 51 has terminals 511 to 514. The terminal 511 is coupled to the antenna connection terminal 100. The terminal 512 is coupled to the input end of the filter 61 and the input end of the filter 62 via the inductor 41L. The terminal 513 is coupled to the input end of the filter 63. The terminal 514 is coupled to the input end of the filter 64.

In this connection configuration, the switch 51 can couple, in accordance with, for example, a control signal from the RFIC 3, the terminal 511 to at least one of the terminals 512 to 514. This means that the switch 51 can couple the antenna 2 to at least one of the filters 61 to 64.

The switch 52, which is an example of a second switch, is coupled between the filters 61 to 64 and the radio-frequency output terminals 121 and 122. The switch 52 is formed by, for example, a multi-connection switching circuit. The switch 52 may be referred to as an output switch. Specifically, the switch 52 has terminals 521 to 526. The terminal 521 is coupled to the output end of the low-noise amplifier 21. The terminal 522 is coupled to the output end of the low-noise amplifier 22. The terminal 523 is coupled to the output end of the low-noise amplifier 23. The terminal 524 is coupled to the output end of the low-noise amplifier 24. The terminal 525 is coupled to the radio-frequency output terminal 121. The terminal 526 is coupled to the radio-frequency output terminal 122.

In this connection configuration, the switch 52 can couple, in accordance with, for example, a control signal from the RFIC 3, at least one of the terminals 521 to 524 to at least one of the terminals 525 and 526. This means that the switch 51 can couple at least one of the low-noise amplifiers 21 to 24 to the radio-frequency output terminal 121 and/or the radio-frequency output terminal 122.

The filter 61 (A-Rx), which is an example of a first filter, has a pass band including the band A. The filter 61 is coupled between the switch 51 and the low-noise amplifier 21. Specifically, the input end of the filter 61 is coupled to the terminal 512 of the switch 51. The output end of the filter 61 is coupled to the input end of the low-noise amplifier 21 via the inductor 44L.

The filter 62 (B-Rx), which is an example of a second filter, has a pass band including the band B. The filter 62 is coupled between the switch 51 and the low-noise amplifier 22. Specifically, the input end of the filter 62 is coupled to the terminal 512 of the switch 51. The output end of the filter 62 is coupled to the input end of the low-noise amplifier 22 via the inductor 45L.

The input end of the filter 61 and the input end of the filter 62 are both coupled to the terminal 512 of the switch 51, so that the terminal 512 functions as a common terminal. These filters 61 and 62 may also be referred to as a diplexer.

The filter 63 (C-Rx), which is an example of a third filter, has a pass band including the band C. The filter 63 is coupled between the switch 51 and the low-noise amplifier 23. Specifically, the input end of the filter 63 is coupled to the terminal 513 of the switch 51. The output end of the filter 63 is coupled to the input end of the low-noise amplifier 23 via the inductor 46L.

The filter 64 (D-Rx), which is an example of a fourth filter, has a pass band including the band D. The filter 64 is coupled between the switch 51 and the low-noise amplifier 24. Specifically, the input end of the filter 64 is coupled to the terminal 514 of the switch 51. The output end of the filter 64 is coupled to the input end of the low-noise amplifier 24 via the inductor 47L.

The control/power supply circuit 71, which is an example of a first electrical circuit, includes at least one of a control circuit and a power supply circuit. In the present embodiment, the control/power supply circuit 71 includes both a control circuit and a power supply circuit, and as a result, the control/power supply circuit 71 can control the low-noise amplifiers 21 to 24 and the switches 51 and 52 and also supply electric power to the low-noise amplifiers 21 to 24. Specifically, the control/power supply circuit 71 receives control signals from the RFIC 3 through the control/power supply terminal 130 and then output control signals to the low-noise amplifiers 21 to 24 and the switches 51 and 52. The control/power supply circuit 71 receives electric power from the power supply (not illustrated in the drawing) and then supplies supply voltage and/or bias signals to the low-noise amplifiers 21 to 24. The control/power supply circuit 71 may include only a control circuit or a power supply circuit.

One or some of the circuit elements illustrated in FIG. 1 may be excluded from the radio-frequency module 1. For example, the radio-frequency module 1 does not necessarily include the inductors 41L to 47L.

1.1.3 Circuit Configuration of Low-Noise Amplifier 21

Figure 2:
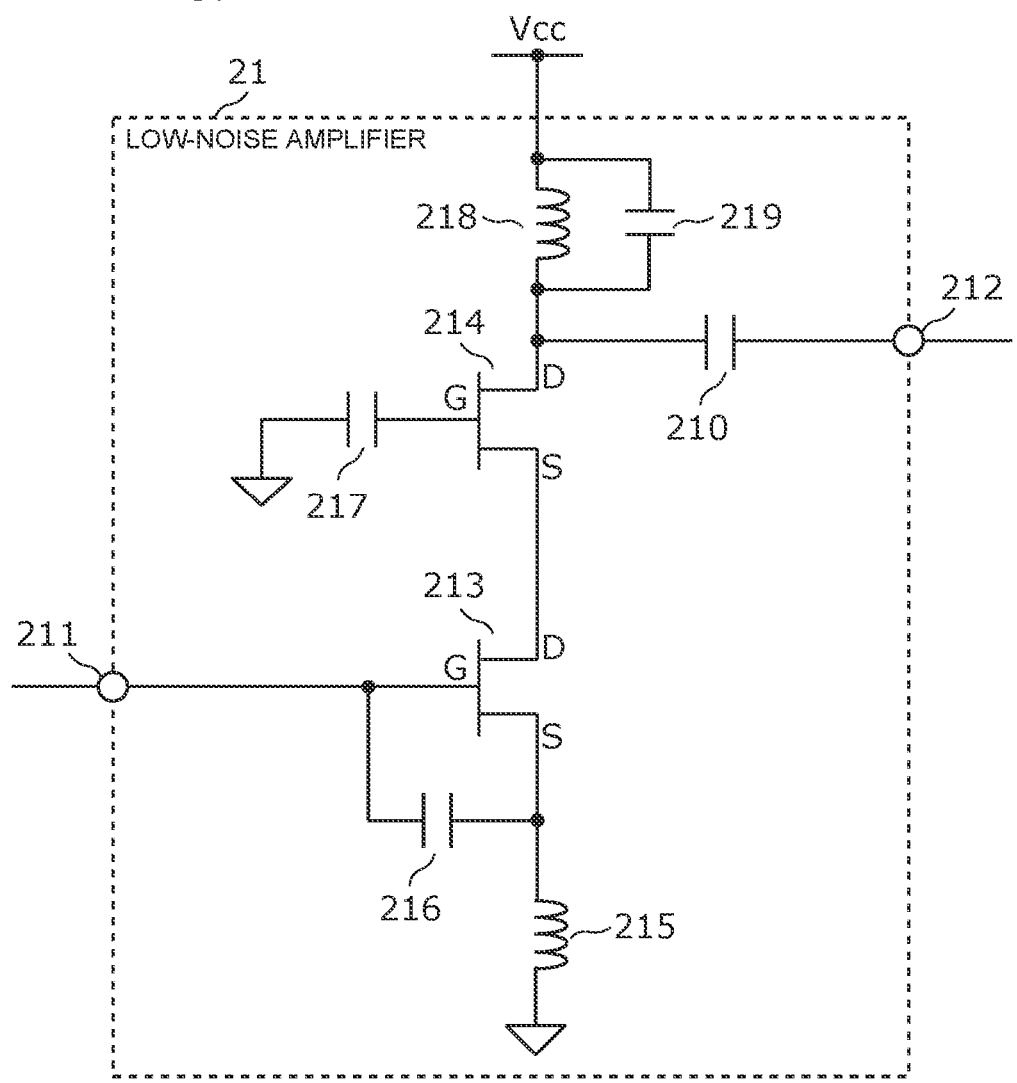
FIG. 2 is a circuit configuration diagram of a low-noise amplifier included in the radio-frequency module according to the embodiment.

Next, a circuit configuration of the low-noise amplifier 21 will be described with reference to FIG. 2. FIG. 2 is a circuit configuration diagram of the low-noise amplifier 21 included in the radio-frequency module 1 according to the present embodiment. The low-noise amplifiers 22 to 24 are identical to the low-noise amplifier 21 with respect to the circuit configuration, and illustrations and descriptions thereof are not repeated.

As illustrated in FIG. 2, the low-noise amplifier 21 includes an input terminal 211, an output terminal 212, cascode-connected field effect transistors (FETs) 213 and 214, inductors 215 and 218, and capacitors 210, 216, 217, and 219.

The input terminal 211 is coupled to the inductor 44L. The input terminal 211 is configured to receive a receive signal in the band A from the filter 61 through the inductor 44L.

The output terminal 212 is coupled to the terminal 521 of the switch 52. The output terminal 212 is configured to output an amplified receive signal in the band A to the radio-frequency output terminal 121 or 122 through the switch 52.

One end of the inductor 215 is grounded. A source terminal of the FET 213 is coupled to the other end of the inductor. A gate terminal of the FET 213 is coupled to the input terminal 211. The capacitor 216 is coupled between the gate and source of the FET 213.

The inductor 215 is an example of a second radio-frequency element and corresponds to the second inductor. The inductor 215 functions as a source inductor for configuring a series feedback.

A source terminal of the FET 214 is coupled to a drain terminal of the FET 213. A gate terminal of the FET 214 is grounded via the capacitor 217. A drain terminal of the FET 214 is coupled to the output terminal 212 via the capacitor 210. The drain terminal of the FET 214 is coupled to a power line for supplying supply voltage through the inductor 218 and the capacitor 219 that are coupled in parallel with each other.

The inductor 218 is an example of a first radio-frequency element and corresponds to the first inductor. The inductor 218 functions as a choke inductor for preventing a radio-frequency signal from flowing out from a radio-frequency signal line for transferring radio-frequency signals to a power line for supplying supply voltage. The inductor 218 functions, in cooperation with the capacitor 219 and 210, as an impedance matching circuit for providing output impedance matching.

The circuit configuration of the low-noise amplifier 21 in FIG. 2 is an example, and this should not be construed in a limiting sense. For example, instead of FETs, heterojunction bipolar transistors (HBTs) may be used.

1.2 Bands A to D

Next, the bands A to D will be described. The bands A to D are frequency bands for a communication system developed by using a Radio Access Technology (RAT). The bands A to D are defined by, for example, a standards organization, such as the 3rd Generation Partnership Project (3GPP) or the Institute of Electrical and Electronics Engineers (IEEE). Examples of the communication system include a system of 5th Generation New Radio (5GNR), a system of Long Term Evolution (LTE), and a system of Wireless Local Area Network (WLAN).

The bands A and B are an example of a first band and a second band. A band group X includes the bands A and B. The bands C and D are an example of a third band and a fourth band. A band group Y consisting of frequencies higher than the band group X includes the bands C and D.

The band groups X and Y, which are an example of a first band group and a second band group, are frequency ranges each including a plurality of bands. As a combination of the band groups X and Y, for example, any two band groups can be selected from a low-band group (698 to 960 MHz), a mid-band group (1427 to 2200 MHz), a high-band group (2300 to 2690 MHz), and an ultra-high-band group (3300 to 5000 MHz), but this should not be construed in a limiting sense. For example, a band group including the unlicensed band of 5 GHz and higher or a millimeter-wave band group may be used as the band group X or Y.

In the present embodiment, two simultaneously receivable bands included in the mid-band group are used as the bands A and B included in the band group X. Specific examples of the bands A and B include LTE Bands 1 and 3, Bands 66 and 25, Bands 34 and 39, and Bands 66 and 70. The combination of the bands A and B are not limited to two simultaneously receivable bands.

In the present embodiment, two simultaneously receivable bands included in the high-band group are used as the bands C and D included in the band group Y. Specific examples of the bands C and D include LTE Bands 7 and 30 and Bands 40A and 41. The combination of the bands C and D are not limited to two simultaneously receivable bands.

1.3 Component Arrangement of Radio-Frequency Module 1

Next, an example of a component arrangement of the radio-frequency module 1 configured as described above will be specifically described with reference to FIGS. 3 to 5.

Figure 3:
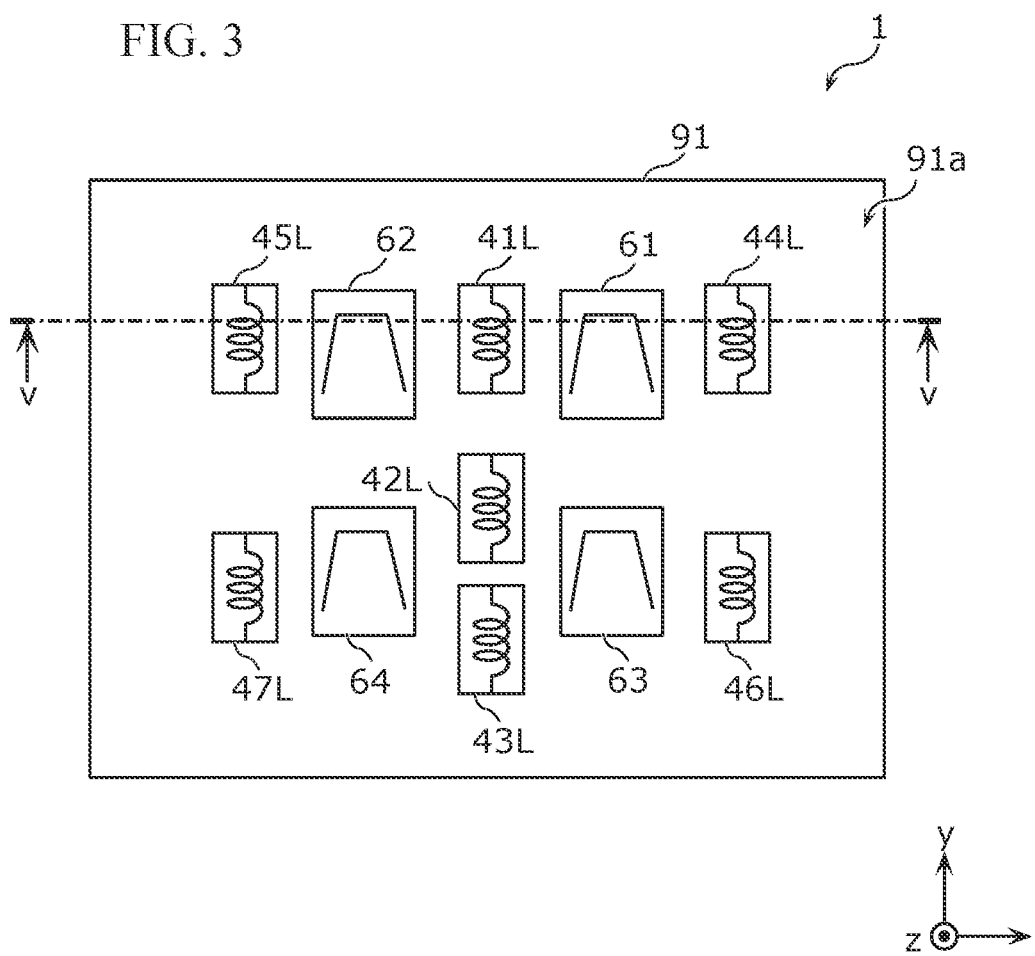
FIG. 3 is a plan view of the radio-frequency module according to the embodiment.

FIG. 3 is a plan view of the radio-frequency module 1 according to the present embodiment. Specifically, FIG. 3 is a diagram illustrating a major surface 91a of a module substrate 91 viewed from the positive side of the Z axis. FIG. 4 is a cutaway plan view of the radio-frequency module 1 according to the present embodiment. Specifically, FIG. 4 is an illustration viewed through a major surface 91b of the module substrate 91 from the positive side of the Z axis. In FIG. 4, an internal structure of an integrated circuit is indicated by dashed lines, and a ground electrode pattern formed at the module substrate 91 is shaded with hatching. FIG. 5 is a sectional view of the radio-frequency module 1 according to the present embodiment. The section of the radio-frequency module 1 in FIG. 5 is taken along line v-v in FIGS. 3 and 4. Not all interconnections between components arranged at the module substrate 91 are illustrated in FIGS. 3 to 5.

The radio-frequency module 1 further includes, in addition to circuit components including the circuit elements illustrated in FIG. 1, the module substrate 91, resin members 93 and 94, a shield-electrode layer 95, and a plurality of post electrodes 150. FIGS. 3 and 4 do not illustrate the resin members 93 and 94 and the shield-electrode layer 95.

The module substrate 91 has the major surfaces 91a and 91b, which are opposite to each other. The major surfaces 91a and 91b are an example of a first major surface and a second major surface. In the present embodiment, the module substrate 91 is rectangular in plan view, but the module substrate 91 is not limited to this shape. The module substrate 91 may be, but not limited to, for example, a low temperature co-fired ceramic (LTCC) substrate having a layered structure of a plurality of dielectric layers, a high temperature co-fired ceramic (HTCC) substrate, a component-embedded substrate, a substrate including a redistribution layer (RDL), or a printed-circuit board.

A ground electrode pattern 92 is formed on the major surface 91b of the module substrate 91. The ground electrode pattern 92 is a planar electrode pattern that is grounded.

Firstly, components disposed on the major surface 91a will be described. As illustrated in FIG. 3, the filters 61 to 64 and the inductors 41L to 47L are disposed on the major surface 91a. The major surface 91a and the components on the major surface 91a are covered by the resin member 93 as illustrated in FIG. 5.

The filters 61 to 64 may be, but not limited to, surface acoustic wave (SAW) filters, acoustic wave filters using bulk acoustic waves (BAW), LC resonance filters, or dielectric filters.

The inductors 41L to 47L are formed by, for example, surface mount devices (SMDs). The inductors 41L to 47L are, however, not limited to SMDs. For example, the inductors 41L to 47L may be formed by integrated passive devices (IPDs) or electrode patterns in the module substrate 91.

The inductor 41L is disposed between the filters 61 and 62 in plan view. The filter 61 is disposed between the inductors 41L and 44L. The filter 62 is disposed between the inductors 41L and 45L. The inductor 45L, the filter 62, the inductor 41L, the filter 61, and the inductor 44L are arranged in the order presented in the X direction.

The inductors 42L and 43L are disposed between the filters 63 and 64 in plan view. The filter 63 is disposed between the inductors 42L and 46L. The filter 64 is disposed between the inductors 43L and 47L. The inductor 47L, the filter 64, the inductor 42L or 43L, the filter 63, and the inductor 46L are arranged in the order presented in the X direction.

The resin member 93 covers the major surface 91a and the components on the major surface 91a. The resin member 93 makes the components on the major surface 91a reliable with respect to characteristics, such as mechanical strength and moisture resistance.

Next, components disposed on the major surface 91b will be described. As illustrated in FIG. 4, an integrated circuit 80 and the plurality of post electrodes 150 are disposed on the major surface 91b. The major surface 91b and the components on the major surface 91b are covered by the resin member 94 as illustrated in FIG. 5.

The integrated circuit 80 is a semiconductor integrated circuit equipped with the low-noise amplifiers 21 to 24, the switches 51 and 52, and the control/power supply circuit 71. The integrated circuit 80 is formed by, for example, complementary metal oxide semiconductor (CMOS). Specifically, the integrated circuit 80 may also be manufactured by a silicon on insulator (SOI) process. This yields inexpensive manufacturing of the integrated circuit 80. The integrated circuit 80 is not limited to these examples. The integrated circuit 80 may be made of at least one of GaAs, SiGe, and GaN. As a result, the integrated circuit 80 can be manufactured with high quality.

In the integrated circuit 80, the switch 51 is disposed between the low-noise amplifiers 21 and 23 in plan view. The low-noise amplifier 23, the switch 51, and the low-noise amplifier 21 are arranged in the order presented in the Y direction. The switch 52 is disposed between the low-noise amplifiers 22 and 24 in plan view. The low-noise amplifier 24, the switch 52, and the low-noise amplifier 22 are arranged in the order presented in the Y direction.

In the integrated circuit 80, the control/power supply circuit 71 is disposed between the low-noise amplifiers 21 and 22, between the low-noise amplifiers 23 and 24, and between the switches 51 and 52 in plan view. Specifically, the low-noise amplifiers 21 and 22 face each other in the X direction with the control/power supply circuit 71 interposed therebetween. The low-noise amplifiers 23 and 24 also face each other in the X direction with the control/power supply circuit 71 interposed therebetween. The switches 51 and 52 also face each other in the X direction with the control/power supply circuit 71 interposed therebetween.

The following is a description of the positional relationship between the integrated circuit 80 disposed on the major surface 91b and the ground electrode pattern 92 formed on the module substrate 91.

In plan view, the ground electrode pattern 92 overlaps the control/power supply circuit 71, but the ground electrode pattern 92 does not overlap the low-noise amplifiers 21 to 24 and the switches 51 and 52. This means that the ground electrode pattern 92 covers the control/power supply circuit 71, but the ground electrode pattern 92 does not cover the low-noise amplifiers 21 to 24 and the switches 51 and 52. The ground electrode pattern 92 is disposed between the low-noise amplifiers 21 and 22, between the low-noise amplifiers 23 and 24, and between the switches 51 and 52 in plan view.

The ground electrode pattern 92 may overlap a part of each of the low-noise amplifiers 21 to 24 and a part of each of the switches 51 and 52 in plan view. Also in this case, the ground electrode pattern 92 can be not overlapping the inductors 215 and 218 and/or the FETs 213 and 214 included in the low-noise amplifiers 21 to 24. The ground electrode pattern 92 can be not overlapping transistors included in the switches 51 and 52.

The ground electrode pattern 92 does not necessarily overlap a part of the control/power supply circuit 71 in plan view. This means that the ground electrode pattern 92 only needs to overlap at least a part of the control/power supply circuit 71 in plan view.

The following is a description of the positional relationship between the inductors 44L to 47L disposed on the major surface 91a and the low-noise amplifiers 21 to 24 of the integrated circuit 80 disposed on the major surface 91b.

At least a part of the inductor 44L overlaps at least a part of the low-noise amplifier 21 in plan view. The inductor 44L and the low-noise amplifier 21 are coupled to each other via, for example, a via-conductor (not illustrated in the drawing) in the module substrate 91.

At least a part of the inductor 45L overlaps at least a part of the low-noise amplifier 22 in plan view. The inductor 45L and the low-noise amplifier 22 are coupled to each other via, for example, a via-conductor (not illustrated in the drawing) in the module substrate 91.

At least a part of the inductor 46L overlaps at least a part of the low-noise amplifier 23 in plan view. The inductor 46L and the low-noise amplifier 23 are coupled to each other via, for example, a via-conductor (not illustrated in the drawing) in the module substrate 91.

At least a part of the inductor 47L overlaps at least a part of the low-noise amplifier 24 in plan view. The inductor 47L and the low-noise amplifier 24 are coupled to each other via, for example, a via-conductor (not illustrated in the drawing) in the module substrate 91.

The plurality of post electrodes 150 include the antenna connection terminal 100, the radio-frequency output terminals 121 and 122, and the control/power supply terminal 130, which are illustrated in FIG. 1, and a ground terminal. The plurality of post electrodes 150 are individually coupled to terminals including an input-output terminal and/or a ground terminal on a mother substrate disposed on the reverse side along the Z axis with respect to the radio-frequency module 1.

The ground terminal included in the plurality of post electrodes 150 overlaps the ground electrode pattern 92 in plan view. The antenna connection terminal 100, the radio-frequency output terminals 121 and 122, and the control/power supply terminal 130 included in the plurality of post electrodes 150 do not overlap the ground electrode pattern 92 in plan view. The ground electrode pattern 92 is disposed between the antenna connection terminal 100 and the radio-frequency output terminals 121 and 122 in plan view.

The resin member 94 covers the major surface 91b and the components on the major surface 91b. The resin member 94 makes the components on the major surface 91b reliable with respect to characteristics, such as mechanical strength and moisture resistance.

The shield-electrode layer 95 is a metallic thin film formed by employing, for example, a sputtering technique. The shield electrode layer 95 covers upper and side surfaces of the resin member 93, side surfaces of the module substrate 91, and side surfaces of the resin member 94. The shield-electrode layer 95 is set at a ground potential, and as a result, the shield-electrode layer 95 can prevent the entrance of foreign noises into the circuit components constituting the radio-frequency module 1.

Figure 4:
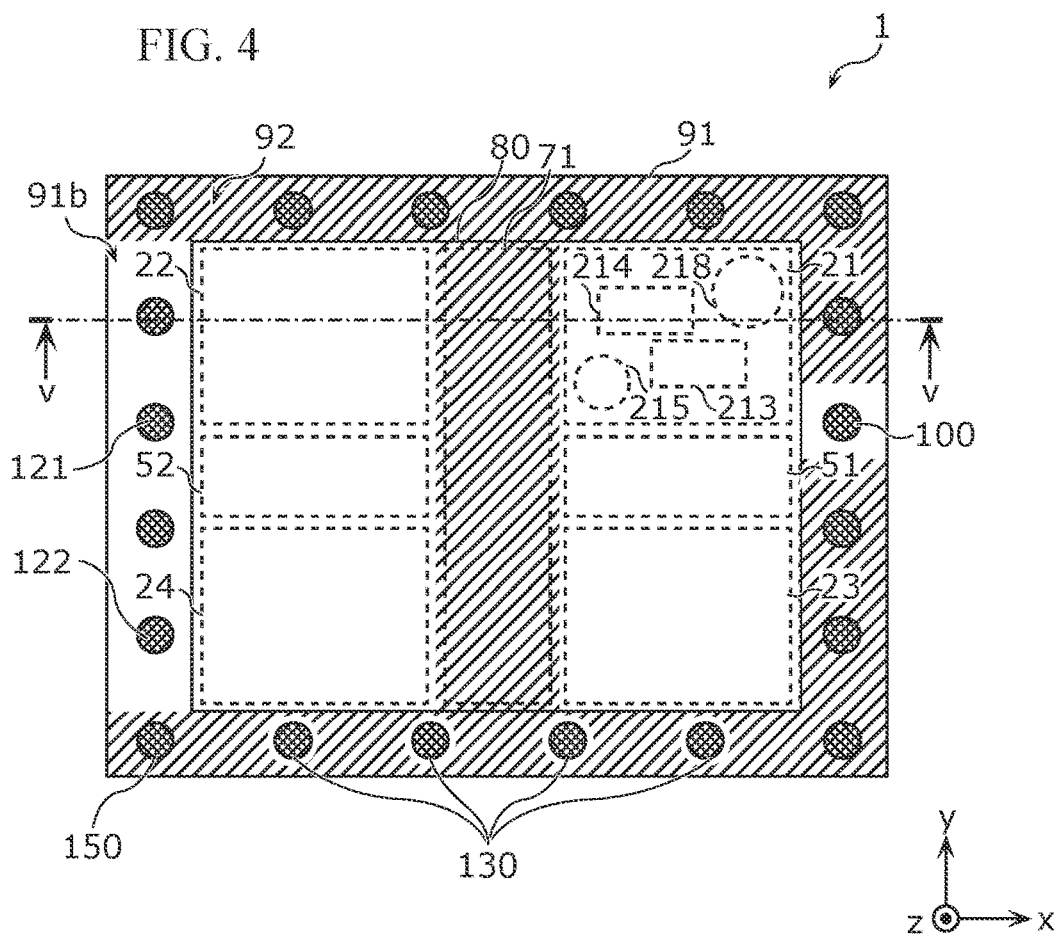
FIG. 4 is a cutaway plan view of the radio-frequency module according to the embodiment.
Figure 5:
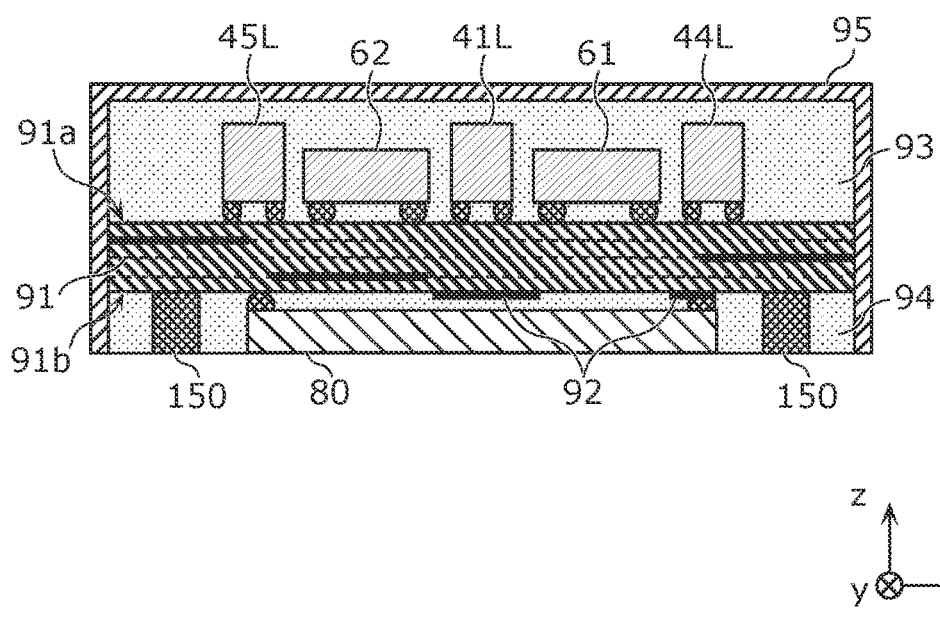
FIG. 5 is a sectional view of the radio-frequency module according to the embodiment.

The structure of the radio-frequency module 1 illustrated in FIGS. 3 to 5 is an example and should not be construed in a limiting sense. For example, although the integrated circuit 80 is rectangular in plan view in FIG. 4, the integrated circuit 80 is not limited to this shape. The radio-frequency module 1 does not necessarily include the resin members 93 and 94 and the shield-electrode layer 95. The radio-frequency module 1 may include a plurality of bump electrodes instead of the plurality of post electrodes 150.

In the present embodiment, the integrated circuit 80 includes the low-noise amplifiers 21 to 24 and the switches 51 and 52 as an example of a second electrical circuit, but the second electrical circuit included in the integrated circuit 80 is not limited to this example. For example, the integrated circuit 80 may include only one of the low-noise amplifiers 21 to 24 and the switches 51 and 52 as the second electrical circuit. The integrated circuit 80 may include part or all of a filter (for example, LC filter) as the second electrical circuit.

1.4 Effects

As described above, the radio-frequency module 1 according to the present embodiment includes the module substrate 91 having the major surface 91b on which the ground electrode pattern 92 is formed and the integrated circuit 80 disposed on the major surface 91b of the module substrate 91. The integrated circuit 80 includes the control/power supply circuit 71 having at least one of a control circuit and a power supply circuit and the second electrical circuit having at least one of an amplifier, a switch, and a filter. In plan view, the ground electrode pattern 92 overlaps at least a part of the control/power supply circuit 71 and does not overlap at least a part of the second electrical circuit.

With this configuration, the ground electrode pattern 92 overlaps at least a part of the control/power supply circuit 71, and thus, it is possible to prevent noise caused in the control/power supply circuit 71 from entering other components. This yields improved electrical characteristics (for example, noise figure (NF)) of the radio-frequency module 1. Furthermore, because the ground electrode pattern 92 does not overlap at least a part of the second electrical circuit, it is possible to reduce the parasitic capacitance between the second electrical circuit and the ground electrode pattern 92. This can, as a result, suppress degradation of characteristics of the electrical circuits formed at the integrated circuit 80.

Further, in the radio-frequency module 1 according to the present embodiment, for example, the second electrical circuit may include an amplifier, and the ground electrode pattern 92 can be not overlapping an inductor included in the amplifier in plan view.

With this configuration, the ground electrode pattern 92 does not overlap the inductor, and thus, it is possible to reduce the effect of the ground electrode pattern 92 on the magnetic field distribution of the inductor. This can hinder degradation of the Q factor of the inductor. As a result, it is possible to suppress degradation of electrical characteristics (for example, NF and gain characteristic) of the amplifier formed in the integrated circuit 80.

Moreover, in the radio-frequency module 1 according to the present embodiment, for example, the second electrical circuit may include an amplifier, and the ground electrode pattern 92 can be not overlapping a transistor included in the amplifier in plan view.

With this configuration, because the ground electrode pattern 92 does not overlap the transistor included in the amplifier, it is possible to reduce the parasitic capacitance between the transistor and the ground electrode pattern 92. As a result, it is possible to suppress degradation of electrical characteristics (for example, NF and gain characteristic) of the amplifier formed in the integrated circuit 80.

Furthermore, in the radio-frequency module 1 according to the present embodiment, for example, the second electrical circuit may include a switch, and the ground electrode pattern 92 can be not overlapping a transistor included in the switch in plan view.

With this configuration, because the ground electrode pattern 92 does not overlap the transistor included in the switch, it is possible to reduce the parasitic capacitance between the transistor and the ground electrode pattern 92. This can, as a result, suppress degradation of electrical characteristics of the switch formed at the integrated circuit 80.

Further, in the radio-frequency module 1 according to the present embodiment, for example, the second electrical circuit may include the low-noise amplifiers 21 and 22, and the ground electrode pattern 92 may be disposed between the low-noise amplifiers 21 and 22 in plan view.

With this configuration, because the ground electrode pattern 92 is disposed between the two low-noise amplifiers 21 and 22, it is possible to improve isolation between the two low-noise amplifiers 21 and 22.

Moreover, in the radio-frequency module 1 according to the present embodiment, for example, the second electrical circuit may include the low-noise amplifiers 23 and 24; the radio-frequency module 1 may include the filter 61 with a pass band including the band A coupled to the low-noise amplifier 21, the filter 62 with a pass band including the band B coupled to the low-noise amplifier 22, the filter 63 with a pass band including the band C coupled to the low-noise amplifier 23, and the filter 64 with a pass band including the band D coupled to the low-noise amplifier 24; the band group X may include the bands A and B, and the band group Y, which consists of frequencies higher than the band group X, may include the bands C and D.

With this configuration, the ground electrode pattern 92 is disposed between the low-noise amplifiers 21 and 22 that can amplify receive signals respectively in the bands A and B, which are included in the same band group X and relatively close to each other, and as a result, isolation can be improved.

Furthermore, in the radio-frequency module 1 according to the present embodiment, for example, the ground electrode pattern 92 may be disposed between the low-noise amplifiers 23 and 24 in plan view.

With this configuration, the ground electrode pattern 92 is disposed between the low-noise amplifiers 23 and 24 that can amplify receive signals respectively in the bands C and D, which are included in the same band group Y and relatively close to each other, and as a result, isolation can be improved.

Further, in the radio-frequency module 1 according to the present embodiment, for example, the second electrical circuit may include the switches 51 and 52; the switch 51 may be coupled between the antenna connection terminal 100 and the filters 61 to 64; the switch 52 may be coupled between the filters 61 to 64 and the radio-frequency output terminals 121 and 122 for providing radio-frequency signals outside; and the ground electrode pattern 92 may be disposed between the switches 51 and 52 in plan view.

With this configuration, because the ground electrode pattern 92 is disposed between the switches 51 and 52, it is possible to improve isolation between the switches 51 and 52.

Moreover, for example, in the radio-frequency module 1 according to the present embodiment, the switch 51 may be disposed between the low-noise amplifiers 21 and 23 in plan view.

With this configuration, isolation between the low-noise amplifier 21 and 23 is better than if the low-noise amplifiers 21 and 23 are adjacent to each other.

Furthermore, for example, in the radio-frequency module 1 according to the present embodiment, the switch 52 may be disposed between the low-noise amplifiers 22 and 24 in plan view.

With this configuration, isolation between the low-noise amplifier 22 and 24 is better than if the low-noise amplifiers 22 and 24 are adjacent to each other.

Further, in the radio-frequency module 1 according to the present embodiment, for example, the ground electrode pattern 92 may be disposed between the low-noise amplifier 22 and the switch 51 and between the low-noise amplifier 24 and the switch 51 in plan view.

With this configuration, it is possible to improve isolation between the switch 51, to which receive signals in a plurality of bands received through the antenna connection terminal 100 are inputted, and the low-noise amplifiers 22 and 24, and consequently, electrical characteristics of the radio-frequency module 1 can be improved.

Moreover, in the radio-frequency module 1 according to the present embodiment, for example, the ground electrode pattern 92 may be disposed between the antenna connection terminal 100 and the radio-frequency output terminals 121 and 122 in plan view.

With this configuration, it is possible to improve isolation between the input and output of receive signals.

Furthermore, in the radio-frequency module 1 according to the present embodiment, for example, the module substrate 91 may have the major surfaces 91*a* and 92*b* that are opposite to each other; the filters 61 to 64 may be disposed on the major surface 91*a*; and the integrated circuit 80 may be disposed on the major surface 91*b*.

With this configuration, components are disposed on both sides of the module substrate 91, and the radio-frequency module 1 can thus be downsized.

Further, for example, the radio-frequency module 1 according to the present embodiment may include the inductor 44L coupled between the filter 61 and the low-noise amplifier 21; the inductor 44L may be disposed on the major surface 91*a*; at least a part of the inductor 44L may overlap at least a part of the low-noise amplifier 21 in plan view.

With this configuration, because at least a part of the inductor 44L overlaps at least a part of the low-noise amplifier 21, it is possible to shorten the interconnection length between the inductor 44L and the low-noise amplifier 21. As a result, it is possible to reduce interconnection loss and mismatching loss due to stray capacitance of the interconnection, and electrical characteristics (for example, NF) of the radio-frequency module 1 can be improved.

Moreover, for example, the radio-frequency module 1 according to the present embodiment may include the inductor 45L coupled between the filter 62 and the low-noise amplifier 22; the inductor 45L may be disposed on the major surface 91*a*; and at least a part of the inductor 45L may overlap at least a part of the low-noise amplifier 22 in plan view.

With this configuration, because at least a part of the inductor 45L overlaps at least a part of the low-noise amplifier 22 in plan view, it is possible to shorten the interconnection length between the inductor 45L and the low-noise amplifier 22. As a result, it is possible to reduce interconnection loss and mismatching loss due to stray capacitance of the interconnection, and electrical characteristics (for example, NF) of the radio-frequency module 1 can be improved.

Furthermore, for example, the radio-frequency module 1 according to the present embodiment may include the inductor 46L coupled between the filter 63 and the low-noise amplifier 23; the inductor 46L may be disposed on the major surface 91*a*; and at least a part of the inductor 46L may overlap at least a part of the low-noise amplifier 23 in plan view.

With this configuration, because at least a part of the inductor 46L overlaps at least a part of the low-noise amplifier 23 in plan view, it is possible to shorten the interconnection length between the inductor 46L and the low-noise amplifier 23. As a result, it is possible to reduce interconnection loss and mismatching loss due to stray capacitance of the interconnection, and electrical characteristics (for example, NF) of the radio-frequency module 1 can be improved.

Further, for example, the radio-frequency module 1 according to the present embodiment may include the inductor 47L coupled between the filter 64 and the low-noise amplifier 24; the inductor 47L may be disposed on the major surface 91*a*; and at least a part of the inductor 47L may overlap at least a part of the low-noise amplifier 24 in plan view.

With this configuration, because at least a part of the inductor 47L overlaps at least a part of the low-noise amplifier 24 in plan view, it is possible to shorten the interconnection length between the inductor 47L and the low-noise amplifier 24. As a result, it is possible to reduce interconnection loss and mismatching loss due to stray capacitance of the interconnection, and electrical characteristics (for example, NF) of the radio-frequency module 1 can be improved.

The communication device 5 according to the present embodiment includes the RFIC 3 configured to process a radio-frequency signal and the radio-frequency module 1 configured to transfer a radio-frequency signal between the RFIC 3 and the antenna 2.

This configuration enables the communication device 5 to achieve almost the same effects as the effects of the radio-frequency module 1.

Modification

Next, a modification to the embodiment described above will be described. This modification differs from the embodiment described above mainly in that the ground electrode pattern is disposed in a larger area.

Hereinafter, the modification will be described with reference to FIG. 6 with a focus on the point different from the embodiment.

Figure 6:
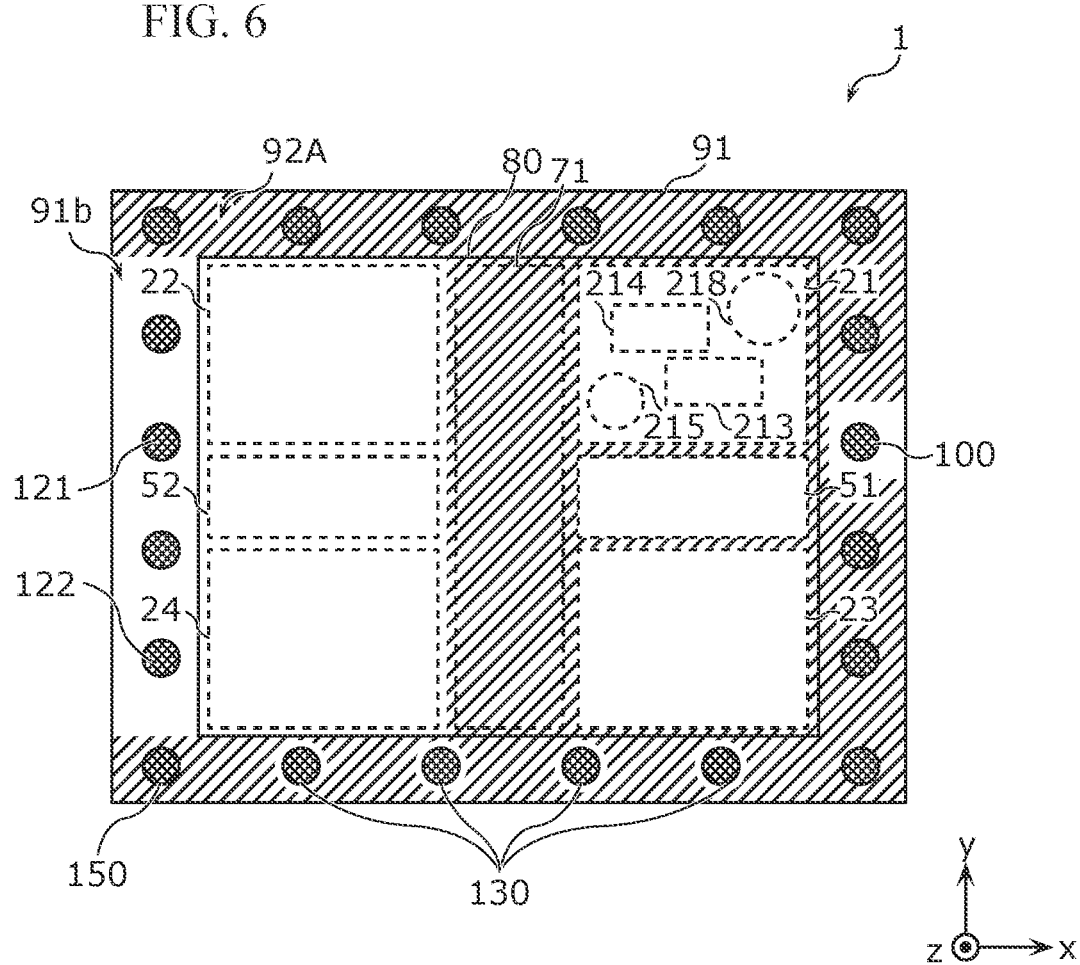
FIG. 6 is a cutaway plan view of a radio-frequency module according to a modification of the embodiment.

FIG. 6 is a cutaway plan view of the radio-frequency module 1 according to the modification of the embodiment. In this modification, instead of the ground electrode pattern 92, a ground electrode pattern 92A is formed on the module substrate 91.

Similarly to the embodiment described above, in plan view, the ground electrode pattern 92A according to this modification overlaps the control/power supply circuit 71, but the ground electrode pattern 92A does not overlap the low-noise amplifiers 21 to 24 and the switches 51 and 52. This means that the ground electrode pattern 92A covers the control/power supply circuit 71, but the ground electrode pattern 92A does not cover the low-noise amplifiers 21 to 24 and the switches 51 and 52. The ground electrode pattern 92A is disposed between the low-noise amplifiers 21 and 22, between the low-noise amplifiers 23 and 24, and between the switches 51 and 52 in plan view.

In this modification, the ground electrode pattern 92A is also disposed between the low-noise amplifier 21 and the switch 51 and between the low-noise amplifier 23 and the switch 51 in plan view.

As described above, in the radio-frequency module 1 according to this modification, the ground electrode pattern 92A may be disposed between the low-noise amplifier 21 and the switch 51 and between the low-noise amplifier 23 and the switch 51 in plan view.

With this configuration, it is possible to improve isolation between the switch 51, to which receive signals in a plurality of bands received through the antenna connection terminal 100 are inputted, and the low-noise amplifiers 21 and 23, and consequently, electrical characteristics of the radio-frequency module 1 can be improved.

OTHER EMBODIMENTS

Although the radio-frequency module and communication device according to the present disclosure have been described above by using the embodiment, the radio-frequency module and communication device according to the present disclosure are not limited to the embodiment described above. The present disclosure also embraces other embodiments implemented as any combination of the constituent elements of the embodiment, other modified examples obtained by making various modifications that occur to those skilled in the art without necessarily departing from the scope of the embodiment described above, and various hardware devices including the radio-frequency module and communication device.

For example, in the circuit configuration of the radio-frequency module and communication device according to the embodiment described above, another circuit element, wiring, and the like may also be inserted in paths connecting any of the circuit components and signal paths that are illustrated in the drawings.

Although in the embodiment described above the radio-frequency module is a receive module, this should not be construed in a limiting sense. The radio-frequency module may be, for example, a transmit module. In this case, the radio-frequency module may include a power amplifier instead of the low-noise amplifier. The radio-frequency module may also be a transmit and receive module.

Furthermore, in the embodiment described above, the radio-frequency module may further include a receive path supporting another band.

The present disclosure can be used as a radio-frequency module provided at the front-end for a wide variety of communication devices such as a mobile phone.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio-frequency module comprising:
   a module substrate having a major surface;
   a ground electrode pattern on the major surface; and
   an integrated circuit on the major surface of the module substrate, the integrated circuit comprising a first electrical circuit comprising a control circuit or a power supply circuit, and a second electrical circuit comprising a first low-noise amplifier and a second low-noise amplifier,
   wherein in plan view, the ground electrode pattern overlaps at least a part of the first electrical circuit, the ground electrode pattern does not overlap any part of the second electrical circuit, and the ground electrode pattern is between the first low-noise amplifier and the second low-noise amplifier.

2. The radio-frequency module according to claim 1, wherein:
   in the plan view, the ground electrode pattern does not overlap an inductor of the first low-noise amplifier.

3. The radio-frequency module according to claim 1, wherein:
   in the plan view, the ground electrode pattern does not overlap a transistor of the first low-noise amplifier.

4. The radio-frequency module according to claim 1, wherein:
   the second electrical circuit comprises a switch, and
   in the plan view, the ground electrode pattern does not overlap a transistor of the switch.

5. A radio-frequency module comprising:
   a module substrate having a major surface;
   a ground electrode pattern on the major surface;
   an integrated circuit on the major surface of the module substrate, the integrated circuit comprising a first electrical circuit comprising a control circuit or a power supply circuit, and a second electrical circuit comprising a first low-noise amplifier, a second low-noise amplifier, a third low-noise amplifier, and a fourth low-noise amplifier;

the radio frequency module further comprises:
a first filter coupled to the first low-noise amplifier, the first filter having a pass band comprising a first band;
a second filter coupled to the second low-noise amplifier, the second filter having a pass band comprising a second band;
a third filter coupled to the third low-noise amplifier, the third filter having a pass band comprising a third band; and
a fourth filter coupled to the fourth low-noise amplifier, the fourth filter having a pass band comprising a fourth band,
a first band group comprises the first band and the second band, and
a second band group comprises frequencies greater than the first band group, including the third band and the fourth band,
in plan view, the ground electrode pattern overlaps at least a part of the first electrical circuit, the ground electrode pattern does not overlap any part of the second electrical circuit, and the ground electrode pattern is between the first low-noise amplifier and the second low-noise amplifier.

6. The radio-frequency module according to claim 5, wherein in the plan view, the ground electrode pattern is between the third low-noise amplifier and the fourth low-noise amplifier.

7. The radio-frequency module according to claim 5, wherein:
the second electrical circuit comprises a first switch and a second switch,
the first switch is coupled between an antenna connection terminal and the first filter, the second filter, the third filter, and the fourth filter,
the second switch is coupled between the first filter, the second filter, the third filter, and the fourth filter and an output terminal, and
in the plan view, the ground electrode pattern is between the first switch and the second switch.

8. The radio-frequency module according to claim 7, wherein in the plan view, the first switch is between the first low-noise amplifier and the third low-noise amplifier.

9. The radio-frequency module according to claim 7, wherein in the plan view, the second switch is between the second low-noise amplifier and the fourth low-noise amplifier.

10. The radio-frequency module according to claim 7, wherein in the plan view, the ground electrode pattern is between the second low-noise amplifier and the first switch, and between the fourth low-noise amplifier and the first switch.

11. The radio-frequency module according to claim 10, wherein in the plan view, the ground electrode pattern is between the first low-noise amplifier and the first switch, and between the third low-noise amplifier and the first switch.

12. The radio-frequency module according to claim 7, wherein in the plan view, the ground electrode pattern is between the antenna connection terminal and the output terminal.

13. A radio-frequency module comprising:
a module substrate having a first major surface and a second major surface that are opposite to each other,
a ground electrode pattern on the second major surface;
an integrated circuit on the second major surface of the module substrate, the integrated circuit comprising a first electrical circuit comprising a control circuit or a power supply circuit, and a second electrical circuit comprising an amplifier, a switch, or a filter;
a first filter having a pass band comprising a first band;
a second filter having a pass band comprising a second band;
a third filter having a pass band comprising a third band; and
a fourth filter having a pass band comprising a fourth band, wherein:
in plan view, the ground electrode pattern overlaps at least a part of the first electrical circuit, and the ground electrode pattern does not overlap any part of the second electrical circuit,
the second electrical circuit comprises a first low-noise amplifier coupled to the first filter, a second low-noise amplifier coupled to the second filter, a third low-noise amplifier coupled to the third filter, and a fourth low-noise amplifier coupled to the fourth filter,
in the plan view, the ground electrode pattern is between the first low-noise amplifier and the second low-noise amplifier,
a first band group comprises the first band and the second band, and
a second band group comprises frequencies greater than the first band group, including the third band and the fourth band,
the first filter, the second filter, the third filter, and the fourth filter are on the first major surface.

14. The radio-frequency module according to claim 13, further comprising:
a first inductor coupled between the first filter and the first low-noise amplifier, wherein:
the first inductor is on the first major surface, and
at least a part of the first inductor overlaps at least a part of the first low-noise amplifier in the plan view.

15. The radio-frequency module according to claim 13, further comprising:
a second inductor coupled between the second filter and the second low-noise amplifier, wherein:
the second inductor is on the first major surface, and
at least a part of the second inductor overlaps at least a part of the second low-noise amplifier in the plan view.

16. The radio-frequency module according to claim 13, further comprising:
a third inductor coupled between the third filter and the third low-noise amplifier, wherein:
the third inductor is on the first major surface, and
at least a part of the third inductor overlaps at least a part of the third low-noise amplifier in the plan view.

17. The radio-frequency module according to claim 13, further comprising:
a fourth inductor coupled between the fourth filter and the fourth low-noise amplifier, wherein:
the fourth inductor is on the first major surface, and
at least a part of the fourth inductor overlaps at least a part of the fourth low-noise amplifier in the plan view.

18. A communication device comprising:
a signal processing circuit configured to process a radio-frequency signal; and
the radio-frequency module according to claim 1, the radio-frequency module being configured to pass the radio-frequency signal between the signal processing circuit and an antenna.

19. A communication device comprising:
a signal processing circuit configured to process a radio-frequency signal; and
the radio-frequency module according to claim 13, the radio-frequency module being configured to pass the radio-frequency signal between the signal processing circuit and an antenna.

\* \* \* \* \*